(12) United States Patent
Sano

(10) Patent No.: US 6,222,142 B1
(45) Date of Patent: Apr. 24, 2001

(54) COMBINATION SWITCH DEVICE HAVING LEVER SWITCH UNIT EASILY MOUNTED TO AN ELECTRONIC CONTROL UNIT

(75) Inventor: Yukiharu Sano, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/448,826

(22) Filed: Nov. 24, 1999

(30) Foreign Application Priority Data

Nov. 25, 1998 (JP) .................................................. 10-334334

(51) Int. Cl.$^7$ ........................................................ H01H 9/00
(52) U.S. Cl. ............................................................ 200/61.54
(58) Field of Search ............................. 200/61.27–61.38, 200/61.54, 61.57, 293–308

(56) References Cited

U.S. PATENT DOCUMENTS

| | | | |
|---|---|---|---|
| 5,263,871 | * 11/1993 | Sano ...................................... | 439/157 |
| 5,324,203 | * 6/1994 | Sano et al. .............................. | 439/34 |
| 5,895,899 | * 4/1999 | Sano .................................. | 200/61.54 |
| 5,936,215 | * 8/1999 | Masuda et al. ...................... | 200/61.3 |
| 5,977,494 | * 11/1999 | Sano et al. ........................ | 200/61.54 |

FOREIGN PATENT DOCUMENTS 10-74573   3/1998   (JP) ................................ H01R/35/04

* cited by examiner

*Primary Examiner*—J. R. Scott
(74) *Attorney, Agent, or Firm*—Sughrue, Mion, Zinn, Macpeak & Seas, PLLC

(57) ABSTRACT

A combination switch device having lever switch units mounted to a circuit board having an electronic control unit. The lever switch units each include a casing on which a lever is movably mounted, and a housing containing switch side terminals which communicate with switch contacts on the casing. The combination switch device includes a body formed with fitting parts on which the lever switch units are mounted. Circuit board side terminals are provided on the fitting parts so as to contact the switch side terminals upon engagement of the lever switch units with the body. The casing and housing have a pair of parallel fitting faces and a pair of parallel flexible support plates, respectively, a locking hole provided on either the fitting faces or the support plates, and a locking projection for inserting in the locking hole. The locking projection is smaller than the locking hole to be movably undetachable, so that the switch side terminals and the housings are movably fitted to the casings.

2 Claims, 7 Drawing Sheets

COMBINATION SWITCH DEVICE HAVING LEVER SWITCH UNIT EASILY MOUNTED TO AN ELECTRONIC CONTROL UNIT

BACKGROUND OF THE INVENTION

1. Field of Invention

This invention relates to a combination switch device comprising a body incorporating an electronic control unit and a lever switch unit incorporating switch contacts and mounted on the body.

2. Related Art

One of the combination switch devices of this type is disclosed in Japanese Patent Publication No. JP-A-10-74573 (referred to as "a rotary connector" in the publication). This conventional combination switch device will be explained referring to FIGS. 7 and 8. FIG. 7 is an exploded perspective view of the conventional combination switch device, and FIG. 8 is a sectional view of the combination switch device as shown in FIG. 7 in a state where the lever switch units are mounted thereon.

A combination switch device 1 includes a stationary housing 3, a movable housing 5 rotatably connected to the stationary housing 3, and a flexible cable 13 wound and contained in an annular space 11 defined between an outer cylindrical member 7 and an inner cylindrical member 9 of both the housings 3 and 5. The outer cylindrical member 7 of the stationary housing 3 is formed with a pair of holding walls 15, 17 which extend substantially diametrically with respect to the space 11. The holding walls 15, 17 are adapted to detachably hold a left and a right lever switch units 19, 21 (referred to as "a stalk switch" in the publication) respectively. A printed circuit board 25 is fixed to a bottom plate 23 of the stationary housing 3. On a rear face of the printed circuit board 25 are mounted a pair of connectors 31, 33 to which connector pins 27, 29 of the lever switch units 19, 21 are respectively connected.

Therefore, when the lever switch units 19, 21 are inserted into the holding walls 15, 17, the connector pins 27, 29 come into contact with the connectors 31, 33, thereby electrically connecting contact circuits incorporated in the lever switch units 19, 21 to an electronic control unit (not shown) on the printed circuit board 25.

SUMMARY OF INVENTION

Therefore, relative positions between the connectors provided on the holding walls and the connector pins of the lever switch units will depend on an accuracy of fitting the printed circuit board to the stationary housing, an accuracy of mounting the connectors to the printed circuit board, or an accuracy of fixing the connector pins to the lever switch units. In case where any of the accuracies is decreased, there will be arisen positional displacements between the connectors and the connector pins of the lever switch units. If the lever switch units are inserted in the holding walls with such positional displacements, terminals will not be able to be connected with each other in a good contact relation, and moreover, there has been such a problem that the connectors will collide against the connector pine thus to break the terminals.

This invention has been made in view of the above circumstances, and it is an object of the invention to provide a combination switch device in which such positional displacements as occurring between terminals to be connected when lever switch units are mounted on a body, and the terminals are prevented from damages by collision thereby enabling the terminals to be connected with each other in a reliable state.

In order to achieve the above described object, a combination switch device as described in the invention includes at least one lever switch unit including a casing on which a lever is movably mounted, the casing incorporating switch contacts which are turned on and off in association with movement of the lever, and a housing containing switch side terminals communicating with the switch contacts, and a body incorporating a circuit board on which an electronic control unit is mounted, the body having a fitting part on which the casing and the housing of the lever switch unit are mounted, circuit board side terminals communicating with the electronic control unit being provided on the fitting part so as to contact with the switch side terminals, characterized in that the switch side terminals and the housing are movably fitted to the casing.

In this combination switch device, the switch side terminals provided in the casing of the lever switch unit and the housing are movably mounted on the casing, and when the casing is fitted to the body to bring the switch side terminals and the circuit board side terminals into contact, the positional displacement between the switch side terminals and the circuit board side terminals will be absorbed through the movable arrangement of the switch side terminals and the housing with respect to the casing.

In the combination switch device as described in the present invention, a pair of parallel fitting faces are formed on either one of the casing and the housing, and a pair of parallel flexible support plates facing with the fitting faces are projected from the other of the casing and the housing, either one of the fitting face and the flexible support plate being formed with a locking hole, the other of the fitting face and the flexible support plate being provided with a locking projection which is adapted to be inserted into the locking hole to be locked, the locking projection being undetachable but movable, and smaller in size than the locking hole.

In this combination switch device, the locking hole formed in one of the fitting face and the flexible support plate is locked with the locking projection formed on the other of the fitting face and the flexible support plate, and the locking projection is undetachable but movable and smaller in size that the locking hole. Therefore, the housing can be movable with respect to the casing to an extent that the locking projection moves inside the locking hole. Accordingly, when the casing is mounted on the body to bring the switch side terminals and the circuit board side terminals into contact with each other, the positional displacements which occur between the switch side terminals and the circuit board side terminals can be absorbed.

DETAILED DESCRIPTION OF PREFERRED EMBODIMENTS

Now, a preferred embodiment of the combination switch device according to the invention will be described in detail with reference to the drawings.

Figure 1:
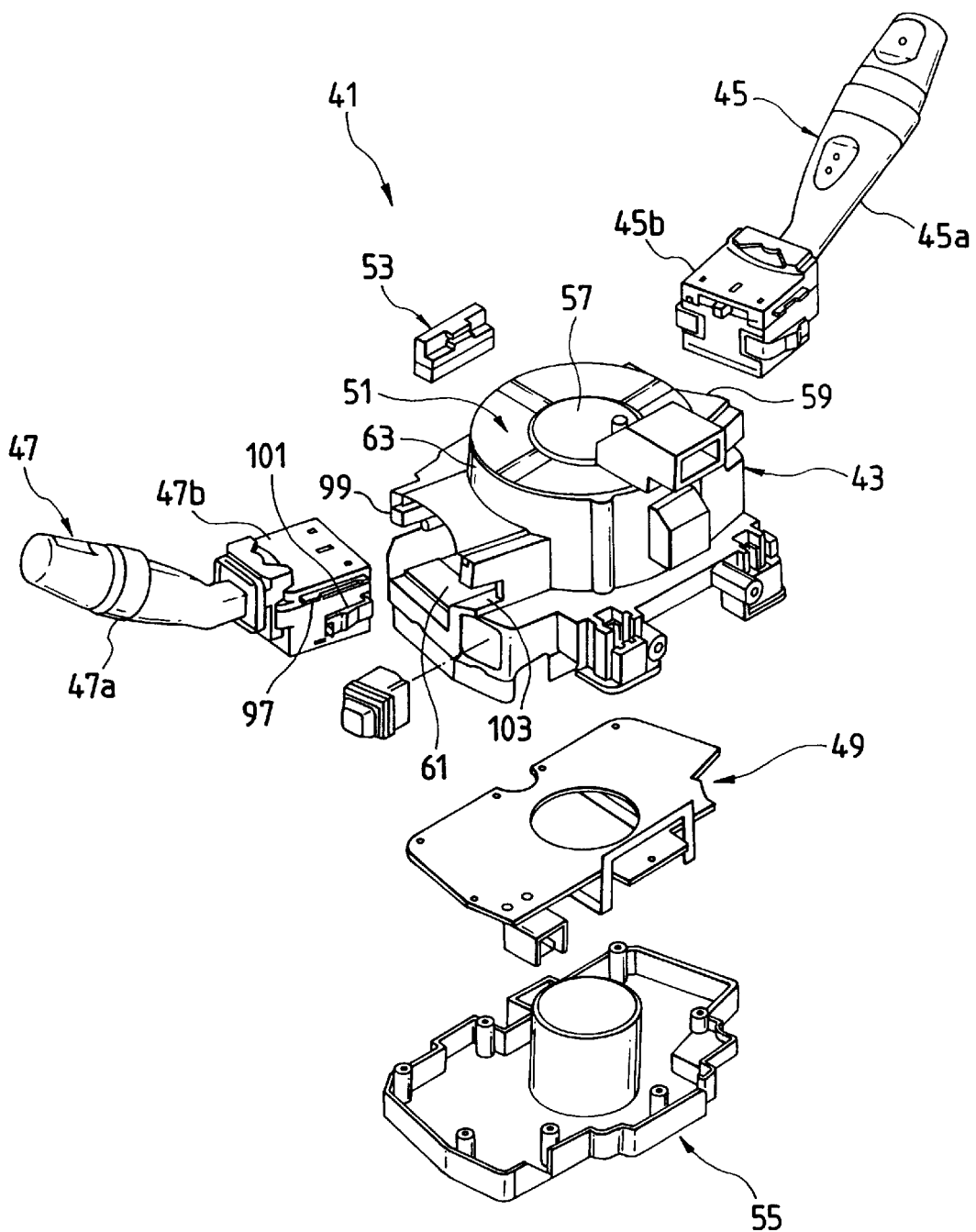
FIG. 1 is an exploded perspective view of a combination switch device according to the invention.

As shown in FIG. 1, a combination switch device 41 in This embodiment consists of a body 43 through which a steering shaft is adapted to be inserted, lever switch units (a first lever switch 45 and a second lever switch 47) respectively assembled to the body 43, a circuit board (ECU board) 49 incorporating an electronic control unit (ECU) and provided in the body 43, a rotary connector 51 provided on the body 43 at its vehicle room side, and a steering wheel angle sensor 53 for converting a rotation angle of the steering wheel to an electric signal which is mounted on a side portion of the body 43, and an ECU cover 55 which is fitted to the body 43 at its engine room side to cover the ECU board.

According to the actual construction, the first lever switch 45 takes charge of switches for turning, passing, dimmer, lighting, etc. The second lever switch 47 takes charge of switches for wiper/washer, rear wiper/washer, etc.

The body 43 has a central bore 57 for inserting the steering shaft, fitting parts 59, 61 for receiving a first and second switch assemblies, and a rotary connector containing part 63 at the vehicle room side.

Figure 2:
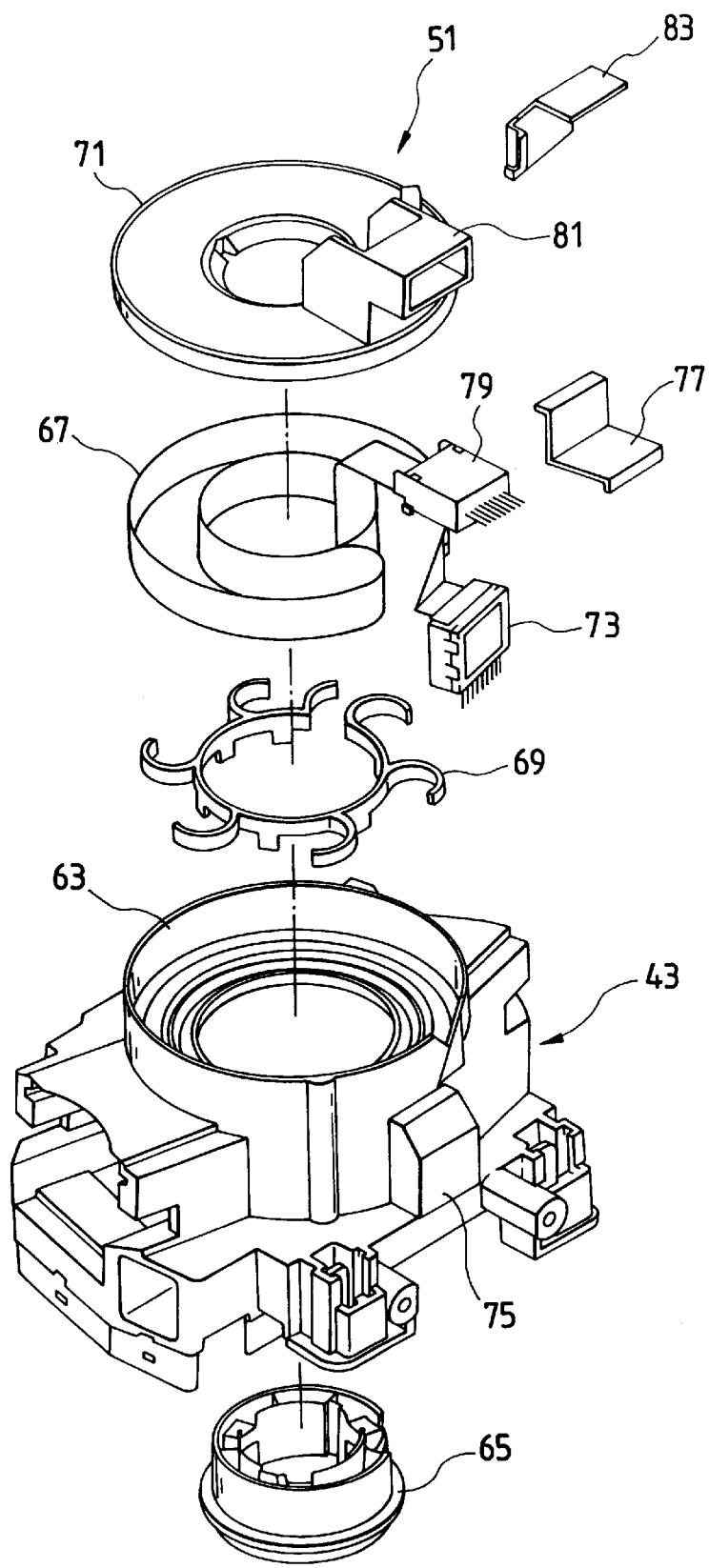
FIG. 2 is an exploded perspective view of a rotary connector as shown in FIG. 1.

The rotary connector 51 consists, as shown in FIG. 2, of a rotator 65 which rotates inside the rotary connector containing part 63, a flexible cable 67 spirally received between the rotary connector containing part 63 and the rotator 65, a carrier 69 which is positioned between the rotator 65 and the flexible cable 67 and adapted to remove a slug of the flexible cable 67 and to facilitate winding and feeding of the flexible cable 67, and an upper cover 71.

A guide portion 75 for exposing a column side connector 73 of the flexible cable 67 to the exterior is formed in the rotary connector containing part 63 of the body 43. The column side connector 73 exposed from the guide portion 75 is partly covered with a cover 77. This column side connector 73 is adapted to be engaged with a column connector which is not shown. A guide portion 81 for exposing a squib side connector 79 of the flexible cable 67 to the exterior is formed in the upper cover 71. The squib side connector 79 exposed from the guide portion 81 is partly covered with a cover 83. This squib side connector 79 is adapted to be engaged with a steering connector which is not shown.

The rotary connector 51 absorbs rotation of the steering wheel by means of the winding and the feeding of the flexible cable 67 and interconnects auxiliary members at the steering side (horn switch, steering switch, audio control switch, inflator switch, etc.) and a wire harness in a vehicle body.

Figure 3:
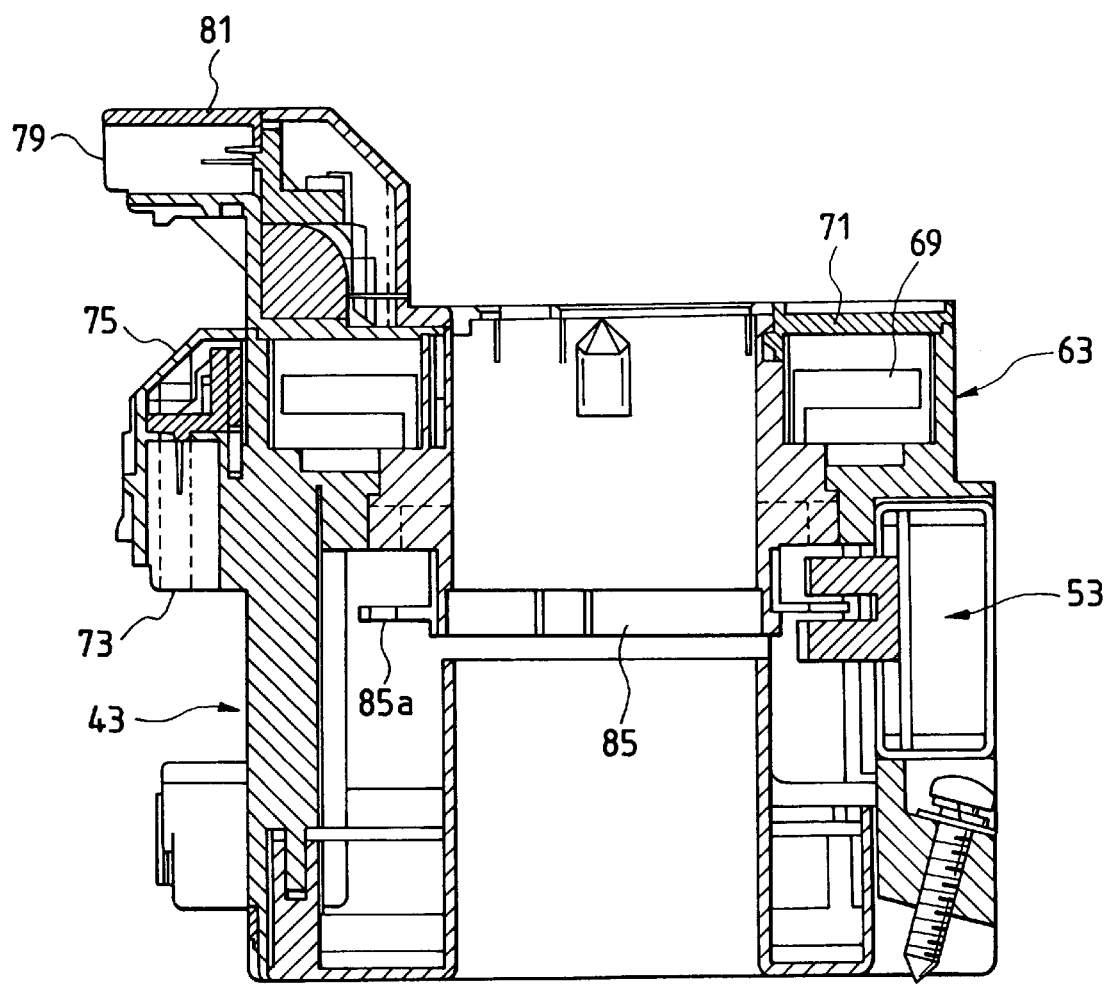
FIG. 3 is a sectional view of a body in FIG. 1 with a steering wheel angle sensor fitted.

The steering wheel angle sensor 51 irradiates a light beam to a alit 85*a* in an encoder plate 85 which-is fitted to the steering shaft so as not to rotate therewith as shown in FIG. 3. The rotation angle of the steering wheel can be detected by supplying the light passing through the slit to the ECU and counting.

Figure 4:
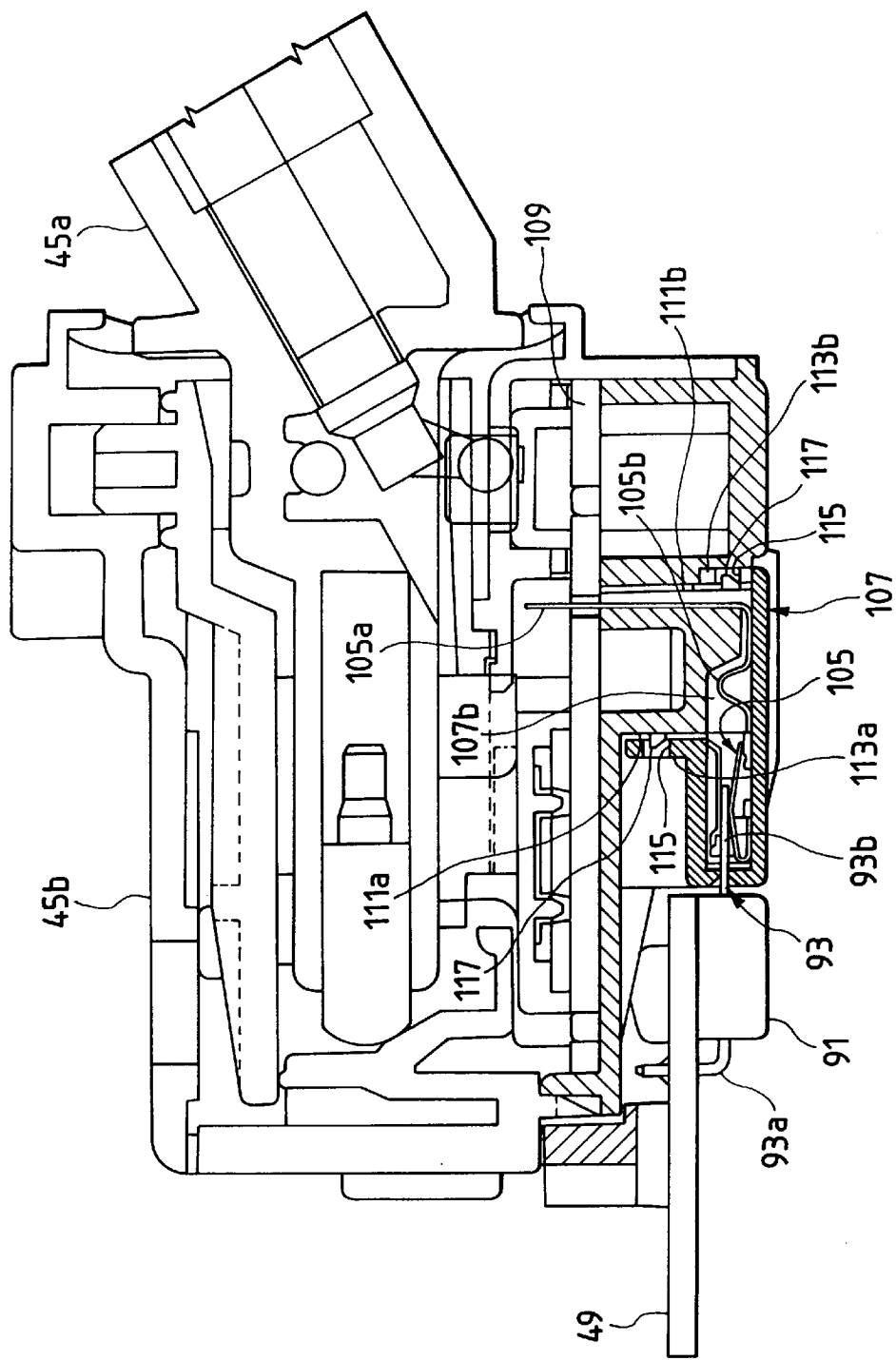
FIG. 4 is a sectional view showing a structure wherein terminals of a lever switch unit and a circuit board are connected.

AS shown in FIG. 4, to the ECU board 49 is integrally fixed a connector 91, which contains a plurality or circuit board side terminals 93 (male terminals in this embodiment). The male terminals 93 are electrically connected at their respective base ends 93*a* to the ECU by way of a determined pattern wiring formed on the ECU board 49. Respective tip ends 93*b* of the terminals 93 project into the first switch assembly receiving part 59 and the second switch assembly receiving part 61 of the body 43. Positions of these projections are so arranged as to be in alignment with terminals of the first lever switch 45 and the second lever switch 47 which will be described later, when the first lever switch 45 and the second lever switch 47 are inserted in the first switch assembly receiving part 59 and the second switch assembly receiving part 61 respectively.

The first lever switch 45 and the second lever switch 47 respectively consist of casings 45*b*, 47*b* and levers 45*a*, 47*a* movably attached to the casings 45*b*, 47*b*. The first lever switch 45 and the second lever switch 47 ire respectively inserted in the first switch assembly receiving part 59 and the second switch assembly receiving part 61, and guided to determined positions by inserting rail-like ribs 97 formed on the casings 45*b*, 47*b* in guide grooves 99 of the first switch assembly receiving part 59 and the second switch assembly receiving part 61. The casings 45*b*, 47*b* inserted into the first switch assembly receiving part 59 and the second switch assembly receiving part 61 are mounted on the body 43 and prevented from being disengaged by locking a resilient locking arm 101 with a locking portion 103.

On this occasion, a plurality of switch side terminals (female terminals in this embodiment) 105 attached to the casings 45*b*, 47*b* are adapted to contact the male terminals 93 on the ECU board 49 respectively.

The female terminals 105 are contained in housings 107 which are formed separately from the casings 45*b*, 47*b*. These housings 107 are attached to bottom faces of the casings 45*b*, 47*b* and inserted in the first switch assembly receiving part 59 and the second switch assembly receiving part 61 together with the casings 45*b*, 47*b*.

Each of the housings 107 is in a form of a flat rectangular parallelepiped, for example, and has at its forward end face openings 107*a* into which the male terminals 93 are introduced. Inside the housing 107 are formed terminal chambers 107*b* which undetachably contain the female terminals 105. A backward end of each of the female terminals 105 extends in a bus bar form to be connected to the determined pattern wiring on a contact circuit board 109 which is provided inside each of the casings 45*b*, 47*b*. This bus bar formed portion 105*a* has a curved portion 105*b*. This curved portion 105*b* can absorb a positional displacement of the female terminal 105 with respect to the base end of the bus bar formed portion 105*a* when the female terminal 105 is moved.

On a lower face of each of the casings 45*b*, 47*b* are formed a pair of parallel fitting faces 111*a*, 111*b* by projecting a part of the lower face. In this embodiment, the fitting faces 111*a*, 111*b* are formed in a plane extending perpendicularly to the direction of mounting the casinge 45*b*, 47*b*. In contrast, the housing 107 has a pair of flexible support plates 113*a*, 113*b* which project so as to face with the fitting faces 111*a*, 111*b*. In short, the fitting faces 111*a*, 111*b* are sandwiched between the flexible support plates 113*a*, 113*b*.

In each of the flexible support plates 113*a*, 113*b* is formed a locking hole 115. Each of the fitting faces 111*a*, 111*b* is provided with a locking projection 117 which is adapted to be inserted into the locking hole 115 and locked at an edge of the locking hole 115. The locking projection 117 cannot be detached but movable, and is smaller in size than the locking hole 115. In this embodiment, the locking projection 117 is smaller in a direction in which the female terminals 105 are arranged, and therefore, the locking projection 117 is locked in the locking hole 115 leaving spaces S for movement at both left and right sides.

Now, operation of the thus constructed combination switch device will be described.

When mounting the first lever switch 45 and the second lever switch 47 on the body 43, the respective casings 45b, 47b of the first lever switch 45 and the second lever switch 47 are inserted into the first switch assembly receiving part 59 and the second switch assembly receiving part 61. Then, the male terminals 93 provided on the ECU board 49 come into alignment with the openings 107a of the housing 107 and are inserted into the openings 107a to be brought into contact with the female terminals 105. This causes the contact circuit boards 109 in the casings 45b, 47b to be electrically connected to the ECU board 49.

Figure 5:
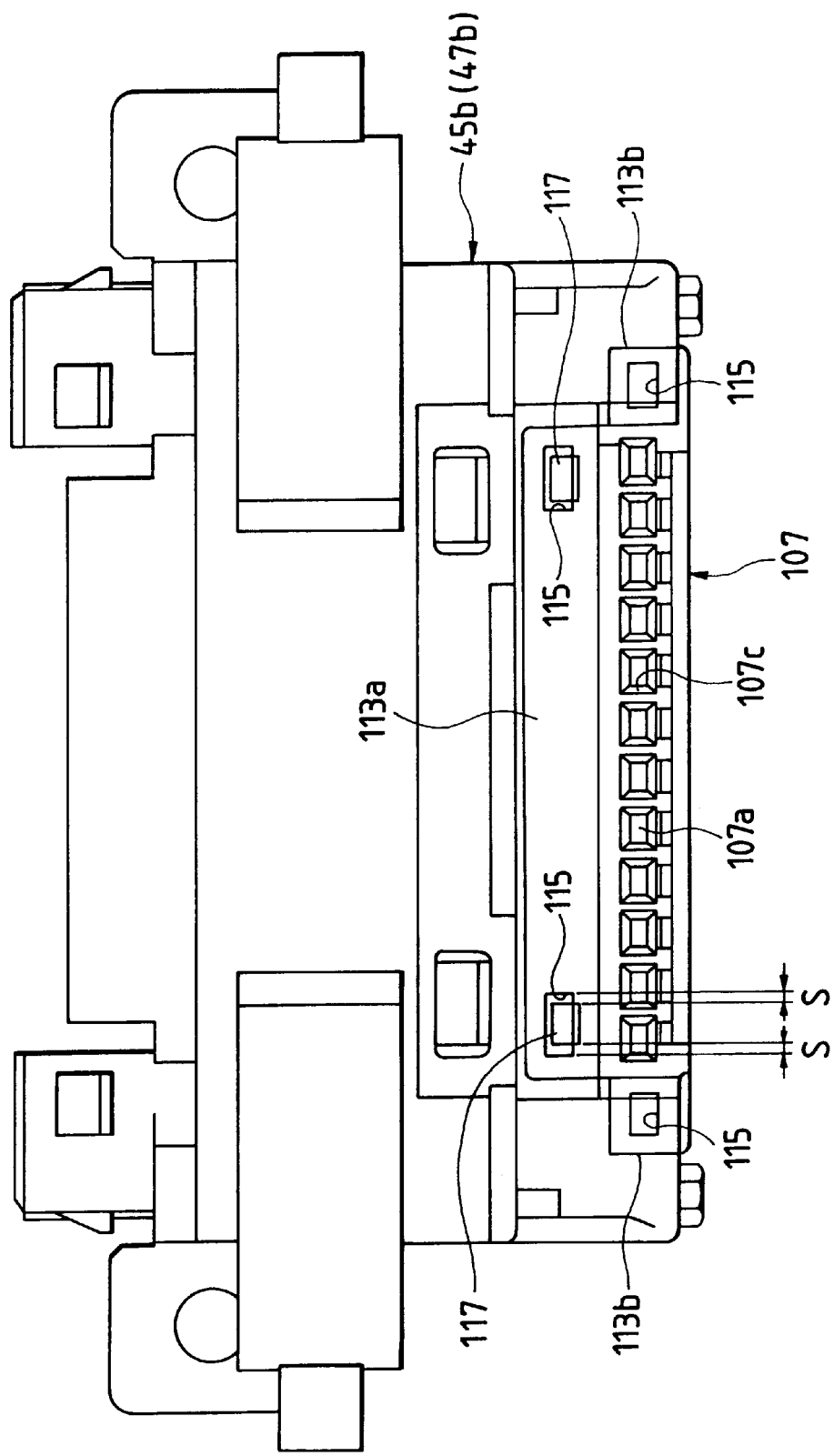
FIG. 5 is a partly penetrating front view of the housing fitted to the lever switch unit.
Figure 6:
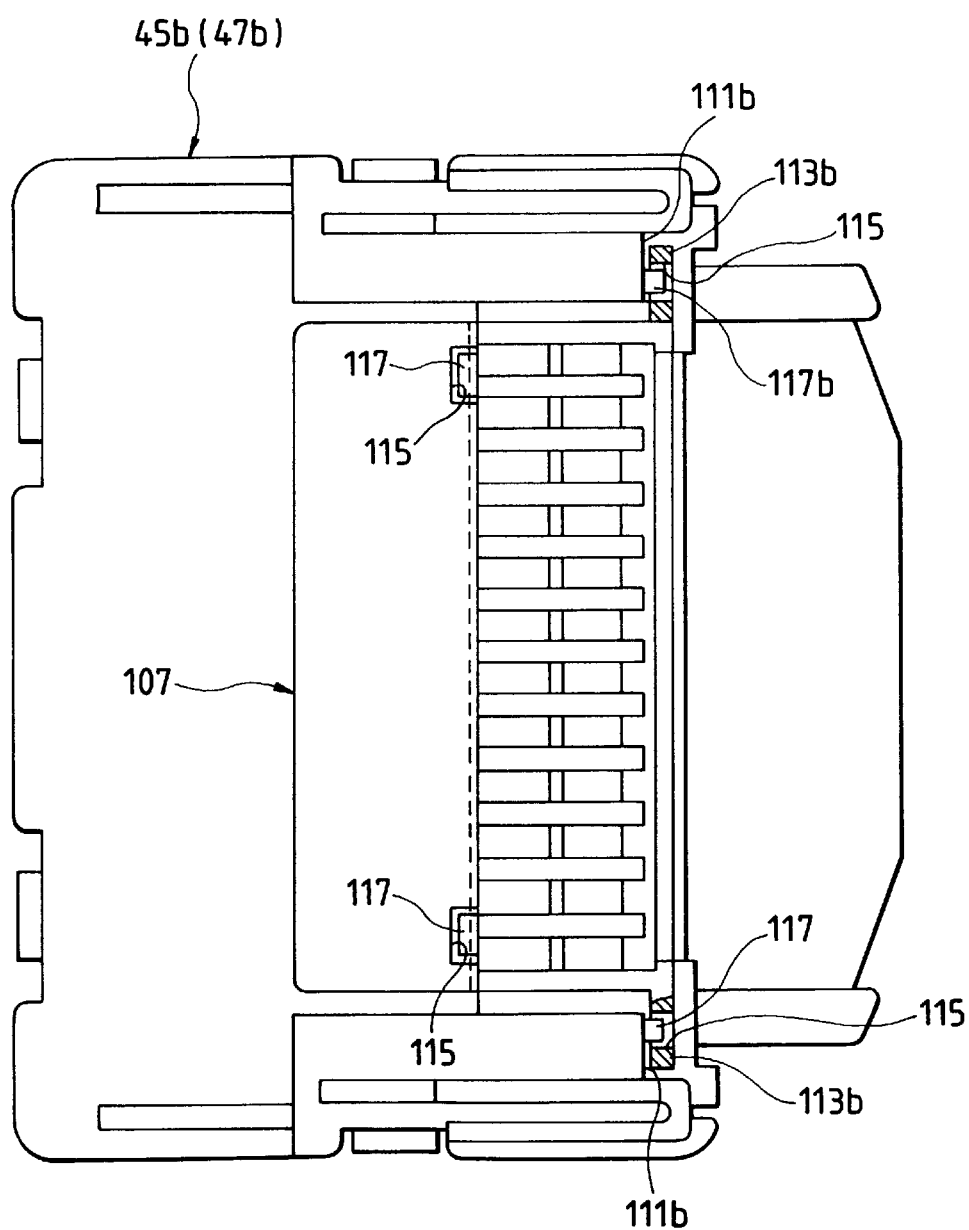
FIG. 6 is a partly penetrating bottom view of the housing fitted to the lever switch unit.
Figure 7:
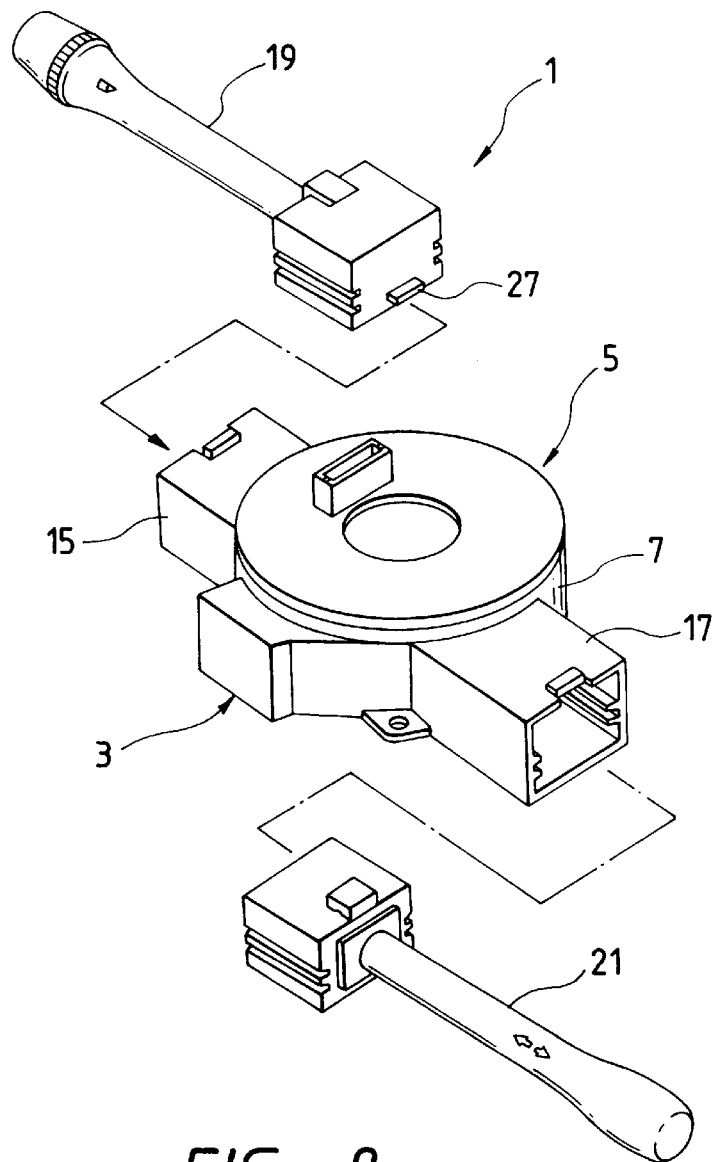
FIG. 7 is an exploded perspective view of a conventional combination switch device.
Figure 8:
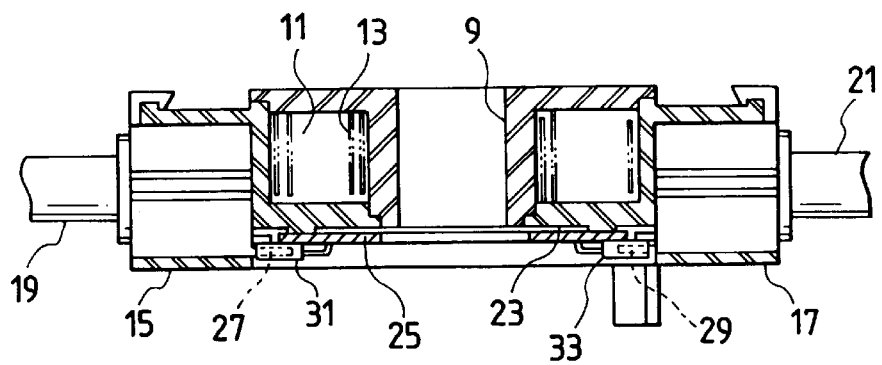
FIG. 8 is a sectional view of the combination switch device in FIG. 7 in a state where the lever switch units are mounted.

In case where the male terminals 93 are displaced from the openings 107a of the housing 107, because there have occurred misalignments in fitting the ECU board 49 to the body 43, in fitting the male terminals to the ECU board 49, and in fitting the female terminals 105 to the casings 45b, 47b, each of the male terminals 93 abuts on a slanted guide face 107c (See FIG. 5) formed on a peripheral edge of the opening 107a to move the housing 107 by a counter force from the male terminal 93, and hence the positional displacement will be absorbed. In this manner, the male terminal 93 which has come into alignment with the opening 107a is inserted into the opening 107a, whereby the male terminal 93 and the female terminal 105 are brought into contact with each other in a good contact relation.

On this occasion, the female terminal 105 also moves along with the movement of the housing 107. However, the positional displacement between the female terminal 105 and the base end of the bus bar formed portion 105a will be absorbed by the curved portion 105b, and will not deform the female terminal 105.

As described above, because the female terminals 105 and the housings 107 which are provided in the casings 45b, 47b can be movably fitted to the casings 45b, 47b, the positional displacements which occur between the female terminals 105 and the male terminals 93 when the casings 45b, 47b are mounted on the body 43 to bring the female terminals 105 and the male terminals 93 into contact with each other will be absorbed by the movement of the female terminals 105 and the housings 107.

Further, because the locking holes 115 formed in the flexible support plates 113a, 113b are locked with the locking projections 117 provided on the fitting faces 111a, 111b, and the locking projections 117 are smaller in size than the locking holes 115, the housing 107 will be movable with respect to the casings 45b, 47b to the extent that the locking projections 117 are movable inside the locking holes 115.

Accordingly, ouch an arrangement that the female terminals 105 and the housings 107 are movable with respect to the casings 45b, 47b can be realized with a minimum number of components and with a simple structure.

In the above described embodiment, the fitting faces 111a, 111b are provided on the casings 45b, 47b, while the flexible support plates 113a, 113b are provided on the housing 107. However, on the contrary, the combination switch device according to the invention which has the flexible support plates 113a, 113b on the casings 45b, 47b and the fitting faces 111a, 111b on the housing 107 will also achieve the similar effect.

Further, the above described embodiment has been explained referring to an example where the locking projections 117 are provided on the fitting faces 111a, 111b, while the locking holes 115 are formed in the flexible support plates 113a, 113b. However, on the contrary, the combination switch device according to the invention which has the locking holes 115 in the fitting plates 111a, 111b and the locking projections 117 on the flexible support plates 113a, 113b will also achieve the similar effect.

Moreover, although the above described embodiment has been explained referring to an example where the terminals provided on the ECU board 49 are male terminals 93, the combination switch device according to the invention will also achieve the similar effect even if the terminals provided on the ECU board 49 is of a structure of a card edge-type connector in which a male tab is not required.

As described in detail hereinabove, in the combination switch device according to the invention, the switch side terminals and the housing provided in the casing of the lever switch unit are movably attached to the casing. Therefore, the positional displacements which occur between the switch side terminals and the circuit board side terminals when the casing is mounted on the body to bring the switch side terminals and the circuit board side terminals into contact with each other will be absorbed by the movable arrangement of the switch side terminals and the housing with respect to the casing. As a result, both the switch side terminals and the circuit board side terminals will be prevented from damages by collision, and will be connected in a reliable manner.

What is claimed is:

1. A combination switch device comprising:

at least one lever switch unit including a casing on which a lever is movably mounted, said casing incorporating switch contacts which are turned on and off in association with movement of said lever, and a housing containing switch side terminals communicating with said switch contacts; and a body incorporating a circuit board on which an electronic control unit is mounted, said body having a fitting part on which said casing and said housing of said lever switch unit are mounted, and circuit board side terminals electrically connected at their base ends with said electronic control unit, and having tip ends projecting into said fitting part so as to contact with said switch side terminals when said casing and said housing are mounted on said fitting part, wherein said switch side terminals and said housing are movably fitted to said casing.

2. A combination switch device as claimed in claim 1, further comprising:

a pair of parallel fitting faces are formed on either one of said casing and said housing;

a pair of parallel flexible support plates facing with said fitting faces are projected from the other of said casing and said housing;

a locking hole provided on one of said fitting faces and said flexible support plates; and a locking projection for inserting into said locking hole to be locked, said locking projection being provided on the other of said fitting faces and said flexible support plates, wherein said locking projection is smaller in size than said locking hole so as to be movably undetachable.

* * * * *